United States Patent
Yang et al.

(10) Patent No.: US 10,050,887 B2
(45) Date of Patent: Aug. 14, 2018

(54) LOAD BALANCING METHOD, DEVICE AND STORAGE MEDIUM

(71) Applicant: Sanechips Technology Co., Ltd., Shenzhen, Guangdong (CN)

(72) Inventors: Guobin Yang, Shenzhen (CN); Weihan Wang, Shenzhen (CN); Shuhua Chen, Shenzhen (CN); Fuzhi Luo, Shenzhen (CN)

(73) Assignee: SANECHIPS TECHNOLOGY CO., LTD., Shenzhen, Guangdong (CN)

( * ) Notice: Subject to any disclaimer, the term of this patent is extended or adjusted under 35 U.S.C. 154(b) by 29 days.

(21) Appl. No.: 15/506,339

(22) PCT Filed: Mar. 31, 2015

(86) PCT No.: PCT/CN2015/075558
§ 371 (c)(1),
(2) Date: Feb. 24, 2017

(87) PCT Pub. No.: WO2016/029693
PCT Pub. Date: Mar. 3, 2016

(65) Prior Publication Data
US 2017/0279724 A1    Sep. 28, 2017

(30) Foreign Application Priority Data
Aug. 25, 2014   (CN) .......................... 2014 1 0422494

(51) Int. Cl.
H04L 12/803     (2013.01)
H04L 12/741     (2013.01)
G06F 17/30      (2006.01)

(52) U.S. Cl.
CPC ...... H04L 47/125 (2013.01); G06F 17/30424 (2013.01); H04L 45/745 (2013.01)

(58) Field of Classification Search
CPC ............. G06F 17/30424; H04L 45/745; H04L 47/125
See application file for complete search history.

(56) References Cited

U.S. PATENT DOCUMENTS 8,094,575 B1 *  1/2012  Vadlakonda .......... H04L 45/123
                                                     370/252
9,397,960 B2 *  7/2016  Arad ..................... H04L 49/358
(Continued)

FOREIGN PATENT DOCUMENTS

CN        1859276 A     11/2006
CN      101714949 A      5/2010
(Continued)

OTHER PUBLICATIONS

International Search Report in international application No. PCT/CN2015/075558, dated Jun. 29, 2015, 2 pgs.
(Continued)

*Primary Examiner* — Khaled Kassim
*Assistant Examiner* — Syed S Ali
(74) *Attorney, Agent, or Firm* — Cooper Legal Group, LLC

(57) ABSTRACT

Disclosed is a load balancing method, the method comprising: for an exchange device at every level, before transmitting each cell, querying a unicast forwarding table according to the ID number of a target access device so as to obtain all links accessing the target access device; and in the all links, polling the cell transmitted to the corresponding target access device. Also disclosed are a load balancing device and storage medium.

9 Claims, 6 Drawing Sheets

(56) References Cited

U.S. PATENT DOCUMENTS

| | | |
|---|---|---|
| 9,594,621 B1* | 3/2017 | Navilappa ............ G06F 11/0793 |
| 2003/0050015 A1 | 3/2003 | Kelly |
| 2005/0157651 A1 | 7/2005 | Ao |
| 2014/0237156 A1* | 8/2014 | Regula ..................... G06F 21/85 |
| | | 710/314 |
| 2015/0215210 A1* | 7/2015 | Shen ...................... H04L 47/125 |
| | | 370/235 |
| 2015/0244617 A1* | 8/2015 | Nakil .................. G06F 9/45558 |
| | | 709/224 |
| 2016/0063060 A1* | 3/2016 | Nguyen ............ G06F 17/30566 |
| | | 707/770 |
| 2016/0094449 A1* | 3/2016 | Ramia ................... H04L 45/021 |
| | | 370/392 |
| 2017/0070434 A1* | 3/2017 | Uzelac .................. H04L 47/125 |
| 2017/0126569 A1* | 5/2017 | Seed ........................ H04W 4/70 |

FOREIGN PATENT DOCUMENTS

| | | |
|---|---|---|
| CN | 102469019 A | 5/2012 |
| CN | 103354525 A | 10/2013 |
| CN | 103401800 A | 11/2013 |

OTHER PUBLICATIONS

Written Opinion of the International Search Authority in international application No. PCT/CN2015/075558, dated Jun. 29, 2015, 6 pgs.

* cited by examiner

Fig. 7

|   | M-1 | M-2 |        | 1 | 0 |
|---|-----|-----|--------|---|---|
| 0 | 0   | 0   | ------ | 1 | 1 |
| 1 | 0   | 1   | ------ | 1 | 0 |
|   |     |     |   |    |   |   |
| N-1 | 1 | 1 |        | 0 | 0 |

LOAD BALANCING METHOD, DEVICE AND STORAGE MEDIUM

TECHNICAL FIELD

The disclosure relates to data exchange technology in the field of mobile communications, and in particular to a load balancing method, apparatus, and a storage medium.

BACKGROUND

At present, an exchange network implements data exchange between exchange access apparatuses in an exchange system. The exchange network is divided into a single-stage exchange network and a three-stage CLOS exchange network. The single-stage exchange network is simple in networking and small in capacity. The three-stage CLOS exchange network is complicated in networking and large in capacity. The single-stage exchange network is simple in networking with each link corresponding to only one access apparatus, so the situation where a plurality of access apparatuses share a link does not exist. Therefore, data streams to different access apparatuses in the exchange network will not affect each other.

In the three-stage CLOS exchange network, as shown in FIG. 1, it is composed of three stages of exchange units. Cells sent by the access apparatus reaches to a destination access apparatus via a three-stage exchange apparatus respectively. In first-stage exchange and second-stage exchange, a link may reach to a plurality of access apparatuses. Therefore, data streams arriving to different access apparatuses will affect each other. A traditional load balancing method performs load balancing in all links instead of distinguishing data streams. Therefore, it may be caused that a data stream arriving to a certain apparatus is transmitted in one or more links, thereby causing the problems of local congestion and bandwidth waste of the data stream.

Data is transmitted in the exchange network on the basis of a cell unit. As shown in FIG. 2, a first-stage exchange apparatus receives cells sent to an access apparatus N−1 and an apparatus N, and two links may both reach to the destination access apparatus currently. In accordance with a traditional load balancing mode, these two links do not distinguish destinations of the cells. Therefore, the cells sent in these two links in a polling way, for example, the first cell is sent to a second-stage exchange apparatus 0, the second cell is sent to a second-stage exchange apparatus 1, the third cell is also sent to the second-stage exchange apparatus 0, and so on. So, all the cells sent to the access apparatus N−1 are sent to the second-stage exchange apparatus 0, and then sent to a third-stage exchange apparatus N−1; and all the cells sent to the access apparatus N are sent to the second-stage exchange apparatus 1, and then sent to a third-stage exchange apparatus N. A final result is that: all the cells sent to the access apparatus N−1 are congested in the third-stage exchange apparatus N−1, and all the cells sent to the access apparatus N are congested in the third-stage exchange apparatus N. Meanwhile, only one of these two links of the destination access apparatuses N and N−1 receives the cells, and the bandwidths of the other link are completely wasted.

As above, the traditional load balancing method cannot ensure that cells arriving to each destination access apparatus are balanced across all accessible links. The load balancing method may cause congestion of cells in a certain exchange apparatus, so the exchange capability is reduced, and meanwhile, bandwidth waste will be caused.

SUMMARY

To solve the existing technical problems, the embodiments of the disclosure provide a load balancing method, apparatus, and a storage medium.

The embodiments of the disclosure provide a load balancing method, which may include the following steps:

querying, for an exchange apparatus at each stage, a unicast forwarding table according to an ID number of a destination access apparatus before each cell is sent so as to obtain all links arriving to the destination access apparatus;

sending, in all the links, the cell arriving to the corresponding destination access apparatus in a polling way.

Sending, in all the links, the cell arriving to the corresponding destination access apparatus in a polling way includes:

setting, for the exchange apparatus at each stage, a corresponding load balancing mask table and querying the load balancing mask table while or after the unicast forwarding table is queried;

performing an AND operation on query results about the unicast forwarding table and the load balancing mask table, and selecting a link having a smaller link number from an AND result via which the cell is sent; and setting a mask corresponding to the selected link in the load balancing mask table as 0 with masks corresponding to the remaining unselected links unchanged, and writing the modified mask back to the load balancing mask table.

The load balancing mask table records the link selected for sending the cell and the unselected links, and after all the links corresponding to an ID number of a destination access apparatus are selected, table entries in this row are all links accessible to the access apparatus.

In an embodiment, the method may further include: setting initial values of table entries of the load balancing mask table corresponding to each destination access apparatus as 0, and writing, after the unicast forwarding table is read and when no link is selected, all the read links into the load balancing mask table.

In an embodiment, the method further includes:

recording, before all the links are selected, the selected link for sending the cell and the unselected links in the load balancing mask table; and re-modifying, after all the links are selected, the table entries in the load balancing mask table as all links accessible to the access apparatus.

The embodiments of the disclosure also provide a storage medium. The storage medium may include a set of instructions, when are executed, causing at least one processor to perform the above-mentioned operations.

The embodiments of the disclosure also provide a load balancing apparatus. The apparatus may be placed in an exchange apparatus at each stage, and may include a link querying module and a cell sending module, wherein the link query module is arranged to query a unicast forwarding table according to an ID number of a destination access apparatus before each cell is sent so as to obtain all links arriving to the destination access apparatus; and the cell sending module is arranged to send, in all the links obtained by the link querying module, the cell arriving to the corresponding destination access apparatus in a polling way.

The cell sending module is arranged to: set, for the exchange apparatus at each stage, a corresponding load balancing mask table, and query the load balancing mask table while or after the unicast forwarding table is queried;

perform an AND operation on query results about the unicast forwarding table and the load balancing mask table, and select a link having a smaller link number from an AND result via which the cell is sent; and set a mask corresponding to the selected link in the load balancing mask table as 0 with masks corresponding to the remaining unselected links unchanged, and write the modified mask back to the load balancing mask table.

The cell sending module includes a setting and querying module, a calculating and selecting module, and a mask processing module, wherein the setting and querying module is arranged to set, for the exchange apparatus at each stage, a corresponding load balancing mask table to, and query the load balancing mask table while or after the unicast forwarding table is queried;

the calculating and selecting module is arranged to perform an AND operation on query results about the unicast forwarding table and the load balancing mask table, and select a link having a smaller link number from an AND result via which the cell is sent; and the mask processing module is arranged to set a mask corresponding to the selected link in the load balancing mask table as 0 with masks corresponding to the remaining unselected links unchanged, and write the modified mask back to the load balancing mask table.

In an embodiment, the mask processing module is further arranged to set initial values of table entries of the load balancing mask table corresponding to each destination access apparatus as 0, and write, after the unicast forwarding table is read and when no link is selected, all the read links into the load balancing mask table.

In an embodiment, the mask processing module is further arranged to: record, before all the links are selected, the selected link for sending the cell and the unselected links in the load balancing mask table; and re-modify, after all the links are selected, the table entries in the load balancing mask table as all links accessible to the access apparatus.

According to the load balancing method, apparatus and the storage medium provided by the embodiments of the disclosure, for an exchange apparatus at each stage, a unicast forwarding table is queried according to an ID number of a destination access apparatus before each cell is sent so as to obtain all links arriving to the destination access apparatus; and in all the links, the cell arriving to the corresponding destination access apparatus is sent in a polling way. In the embodiments of the disclosure, cells arriving to each destination access apparatus may be balanced across to accessible links at an exchange apparatus at each stage by distinguishing the destination access apparatuses to which the cells arrive, so it may be ensured that the cells arriving to the destination access apparatus allocates data streams on all links in a balanced manner, thereby improving the utilization ratio of bandwidths and improving the exchange capability.

BRIEF DESCRIPTION OF THE DRAWINGS

In the drawings (not necessarily drawn in proportion), similar reference numbers may describe similar parts in different views. The similar reference number having different letter suffixes may represent different examples for the similar parts. The drawings substantially show each of the embodiments discussed herein in an example way instead of a limitation way.

FIG. 7 is a structural diagram of a load balancing mask table according to an embodiment of the disclosure.

DETAILED DESCRIPTION

In the embodiments of the disclosure, for an exchange apparatus at each stage, a unicast forwarding table is queried according to an ID number of a destination access apparatus before each cell is sent, so as to obtain all links arriving to the destination access apparatus; and in all the links, the cell arriving to the corresponding destination access apparatus is sent in a polling way.

The disclosure will be further described in detail below in connection with the drawings and specific embodiments.

Figure 3:
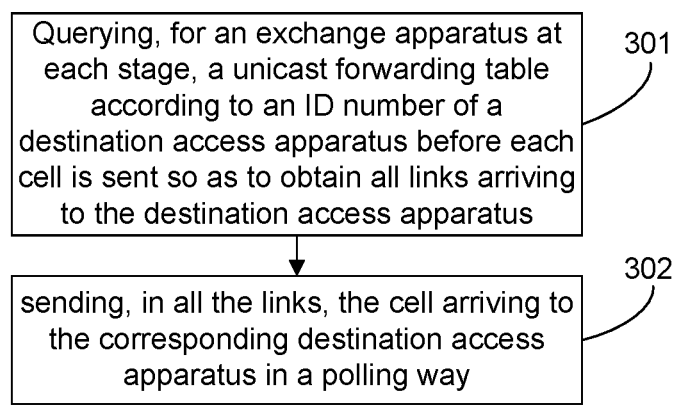
FIG. 3 is an implementation flowchart of a load balancing method according to an embodiment of the disclosure.

FIG. 3 is an implementation flowchart of a load balancing method according to an embodiment of the disclosure. As shown in FIG. 3, the method includes the following steps:

Step 301: querying, for an exchange apparatus at each stage, a unicast forwarding table according to an ID number of a destination access apparatus before each cell is sent so as to obtain all links arriving to the destination access apparatus;

Step 302: sending, in all the links, the cell arriving to the corresponding destination access apparatus in a polling way.

In the embodiments of the disclosure, Step 302 specifically includes the following steps:

Step 3021: setting, for the exchange apparatus at each stage, a corresponding load balancing mask table, and querying the load balancing mask table while or after the unicast forwarding table is queried;

Step 3022: performing an AND operation on query results about the unicast forwarding table and the load balancing mask table, and selecting a link having a smaller link number from an AND result via which the cell is sent;

Step 3023: setting a mask corresponding to the selected link in the load balancing mask table as 0 with masks corresponding to the remaining unselected links unchanged, and writing the modified mask back to the load balancing mask table.

In an embodiment of the disclosure, Step 3022 may also be: performing an AND operation on query results about the unicast forwarding table and the load balancing mask table, and selecting a link having a larger link number from an AND result via which the cell is sent.

In an embodiment of the disclosure, the load balancing mask table records the link selected for sending the cell and the unselected links. For example, the selected link corresponding to an ID number of a destination access apparatus and the unselected links may be correspondingly recorded in each row of the load balancing mask table.

After all links corresponding to an ID number of a certain destination access apparatus are selected, table entries in this row are re-modified as all links accessible to the access apparatus.

In an embodiment of the disclosure, the method further includes: setting initial values of table entries of the load balancing mask table corresponding to each destination access apparatus as 0, and after the unicast forwarding table is read and when no link is selected, writing all the read links into the load balancing mask table.

In an embodiment of the disclosure, the method further includes:

recording, before all the links are selected, the selected link for sending the cell and the unselected links in the load balancing mask table; and re-modifying, after all the links are selected, the table entries in the load balancing mask table as all links accessible to the access apparatus.

Here, since link masks corresponding to the ID number of each access apparatus are independent, in the exchange apparatus, cells arriving to each access apparatus may be allocated in the accessible links in a balanced manner.

Obviously, in the embodiments of the disclosure, cells arriving to each destination access apparatus may be allocated to accessible links at an exchange apparatus at each stage in a balanced manner by distinguishing the destination access apparatuses to which the cells arrive, so it may be ensured that the cells arriving to the destination access apparatus allocates data streams on all links in a balanced manner, thereby improving the utilization ratio of bandwidths and improving the exchange capability.

The embodiments of the disclosure also provide a storage medium. The storage medium includes a set of instructions, when executed, causing at least one processor to perform the above-mentioned operations.

The method of the disclosure will be described in detail below in connection with a specific application scenario.

Figure 1:
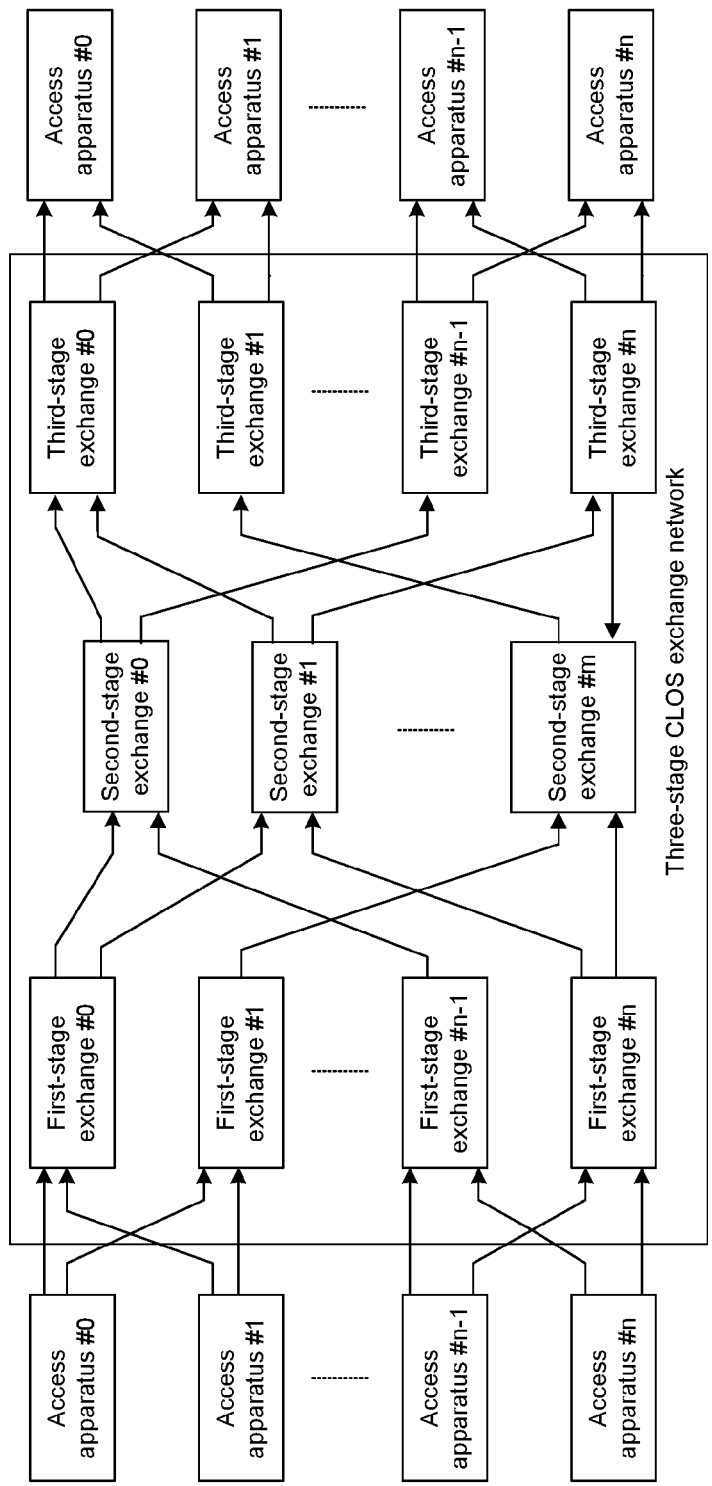
FIG. 1 is a structural diagram of a three-stage CLOS exchange network.
Figure 2:
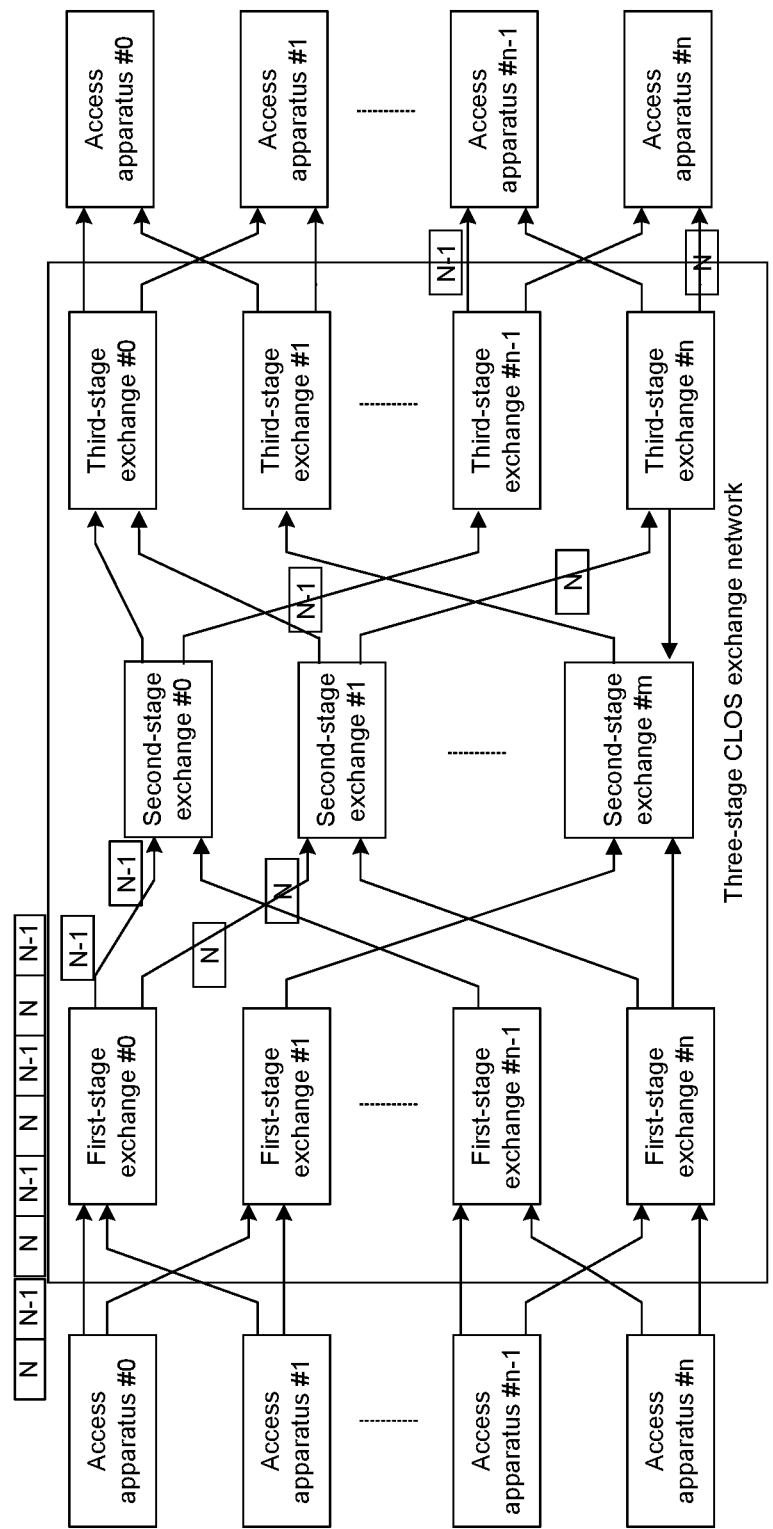
FIG. 2 is a flow diagram of a load balancing cell of a traditional three-stage CLOS exchange network.
Figure 4:
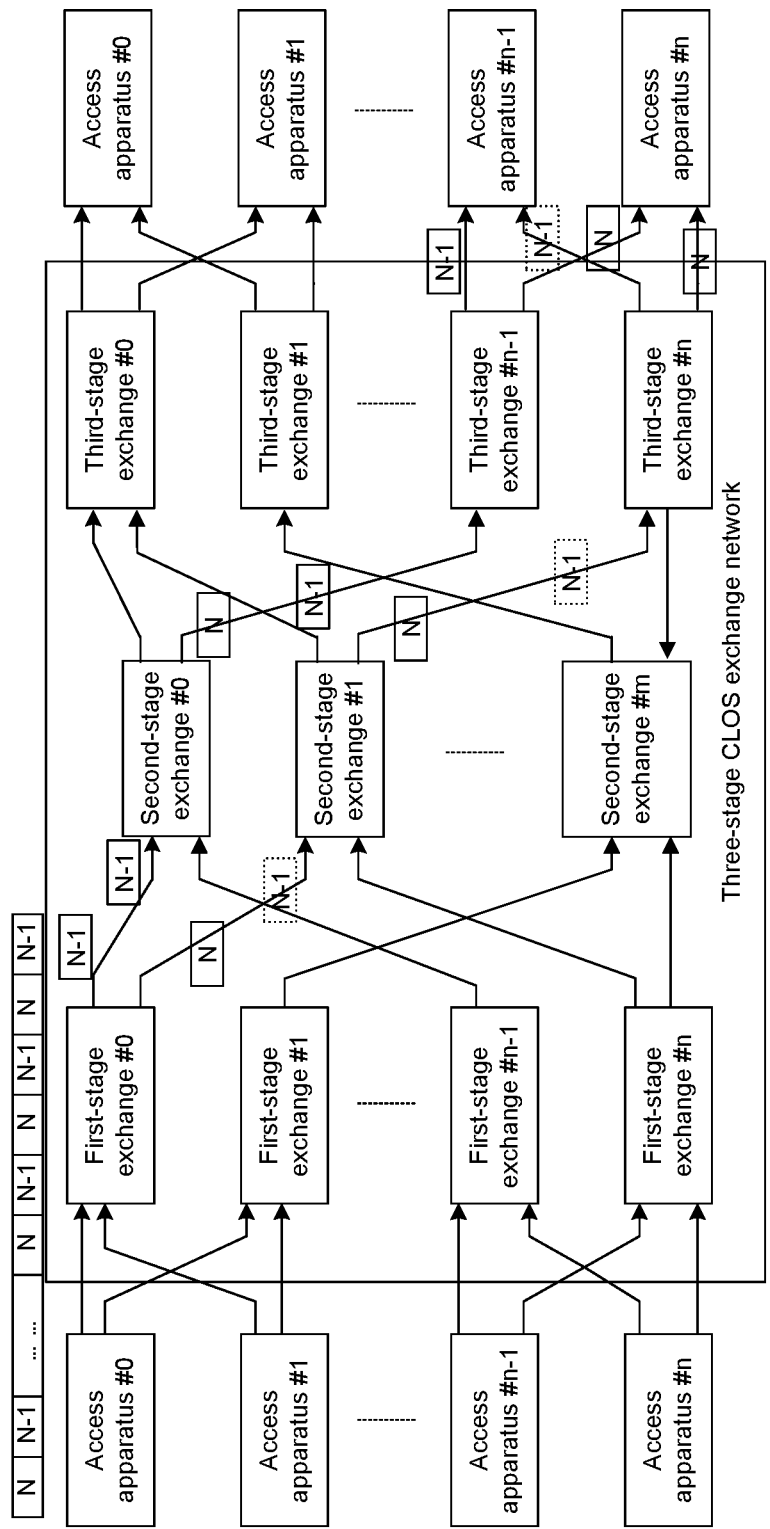
FIG. 4 is a flow diagram of a load balancing cell of a three-stage CLOS exchange network according to an embodiment of the disclosure.

In the present scenario, FIG. 4 shows a structural diagram of a three-stage CLOS exchange network. A data sending mode is the same as that shown in FIG. 2, in order to compare differences between these two load balancing methods. A first-stage exchange apparatus 0 receives cells sent to an access apparatus N−1 and an access apparatus N, and these two kinds of cells may arrive to a destination access apparatus N−1 and a destination access apparatus N via a second-stage exchange apparatus 0 and a second-stage exchange apparatus 1, a third-stage exchange apparatus N−1 and a third-stage exchange apparatus N. As shown in FIG. 2, in accordance with a traditional load balancing mode, cells cannot be equally allocated in all accessible links, thereby causing local congestion of cells and bandwidth waste.

In the embodiment for the present scenario, since processing modes of the load balancing method in the exchange apparatus at each stage are identical, the processing mode in the first-stage exchange apparatus is taken as an example herein. The specific processing mode of the present embodiment is as follows:

Step 1: reading a unicast forwarding table and obtaining two links to an access apparatus N−1, namely a link 0 and a link 1;

Step 2: while or after the unicast forwarding table is read, reading a load balancing mask table. All table entries corresponding to the load balancing mask table currently are 0. In order to ensure that an AND result of data read from the unicast forwarding table and the table entries in the load balancing mask table is not 0, when all the table entries in the load balancing mask table are 0, the table entries are automatically modified as the data read from the unicast forwarding table, that is, two links of which the link numbers are 0 and 1;

Step 3: performing an AND operation on a reading result about the unicast forwarding table and a reading result about the load balancing mask table, to obtain the two links namely the link 0 and the link 1, and selecting the link having a smaller link number, namely the link 0 at this time. Therefore, a cell sent to the access apparatus N−1 will be sent out via the link 0;

Step 4: modifying the load balancing mask table. That is, masks of the link 0 in the table entries of the load balancing mask table are set as 0, so current load balancing masks are masks of the unselected link 1, and the masks are written to a corresponding address in the load balancing mask table.

Here, the address is an address corresponding to a forwarded unicast ID number. Because there is one-to-one correspondence between the load balancing mask table and the unicast forwarding table, each row in the table represents the unicast ID number. For example, the ID number of a cell forwarded currently is 0, so the corresponding address is an address 0.

Figure 7:
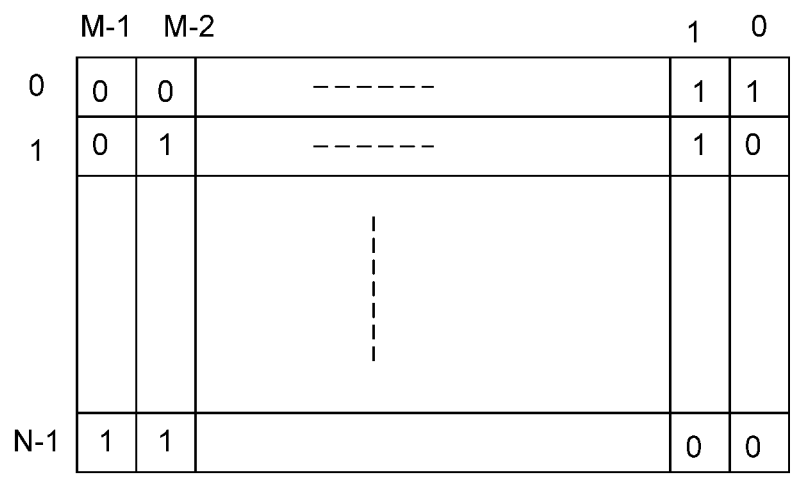

In the embodiment of the disclosure, the load balancing mask table may adopt the structure as shown in FIG. 7, where a row mark represents a unicast ID number as shown by 0 to N−1; a column mark represents a link number as shown by 0 to M−1; each position in the unicast forwarding table is 1 or 0, 1 represents that the link is accessible to the destination access apparatus, and 0 represents that the link is not accessible to the destination access apparatus. For each position in the load balancing mask table, 1 represents that the link is selectable, and 0 represents that the link is not selectable. So, if a certain link is selected when the cell is sent previously, the position corresponding to the ID number will be set as 0, representing that the link has been selected;

Step 5: continuing to read the unicast forwarding table, so as to obtain two links sent to an access apparatus N, namely the link 0 and the link 1. The above-mentioned steps 2, 3 and 4 are repeated to determine that the cell sent to the access apparatus N is sent out from the link 0;

Step 6: continuing to read the unicast forwarding table, so as to obtain two links sent to the access apparatus N−1, namely the link 0 and the link 1;

It is noted that in the embodiments of the disclosure, each time the exchange apparatus at each stage receives a unicast signal, the unicast forwarding table will be read once. Of course, the load balancing mask table will be read once.

Step 7: reading the load balancing mask table sent to the access apparatus N−1, to obtain only the link 1;

Step 8: selecting the link 1 for sending the cell, since the table entries of the load balancing mask table have masks of only the link 1;

Step 9: re-setting the table entries of the load balancing mask table as 0 and writing them into the load balancing mask table, since all the links arriving to the access apparatus N−1 are selected for one time;

Step 10: reading the unicast forwarding table, so as to obtain two links sent to the access apparatus N, namely the link 0 and the link 1. The above-mentioned steps 7, 8 and 9 are repeated to determine that the cell is sent out from the link 1. Since all the links arriving to the access apparatus N are selected for one time, the table entries of the load balancing mask table are re-set as 0, and written into the load balancing mask table.

The load balancing processing methods in the second-stage and third-stage exchange apparatuses are identical to the above-mentioned processing method in the first-stage exchange apparatus, and will not be elaborated herein.

In the above-mentioned process, the cells sent to the access apparatuses N−1 and N are sent in respective accessible links once in a polling way, and the above-mentioned steps are repeated for subsequent cells. As shown in FIG. 4, in this way, the cells arriving to the apparatuses N and N−1 may be equally allocated in all of their own accessible links, thereby achieving the aim of load balancing.

Figure 5:
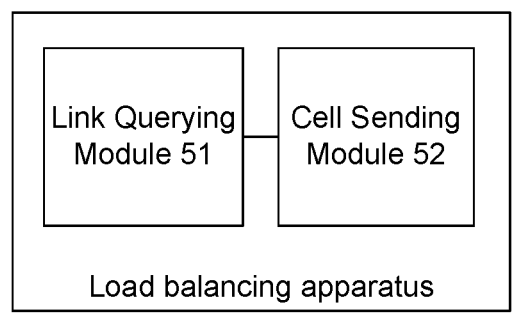
FIG. 5 is a structural diagram of a load balancing apparatus according to an embodiment of the disclosure.

The embodiments of the disclosure also provide a load balancing apparatus. As shown in FIG. 5, the apparatus is placed in an exchange apparatus at each stage, and includes: a link querying module 51 and a cell sending module 52, wherein the link querying module 51 is arranged to query a unicast forwarding table according to an ID number of a destination access apparatus before each cell is sent, so as to obtain all links arriving to the destination access apparatus; and the cell sending module 52 is arranged to send, in all the links obtained by the link querying module, the cell arriving to the corresponding destination access apparatus in a polling way.

During practical application, the link querying module 51 and the cell sending module 52 may be implemented by a Central Processing Unit (CPU), a Digital Signal Processor (DSP) or a Field-Programmable Gate Array (FPGA) in the load balancing apparatus.

The cell sending module 52 is specifically arranged to: set, for the exchange apparatus at each stage, a corresponding load balancing mask table, and query the load balancing mask table while or after the unicast forwarding table is queried;

perform an AND operation on query results about the unicast forwarding table and the load balancing mask table, and select a link having a smaller link number from an AND result via which the cell is sent; and set a mask corresponding to the selected link in the load balancing mask table as 0, with masks corresponding to the remaining unselected links unchanged, and write the modified mask back to the load balancing mask table.

Figure 6:
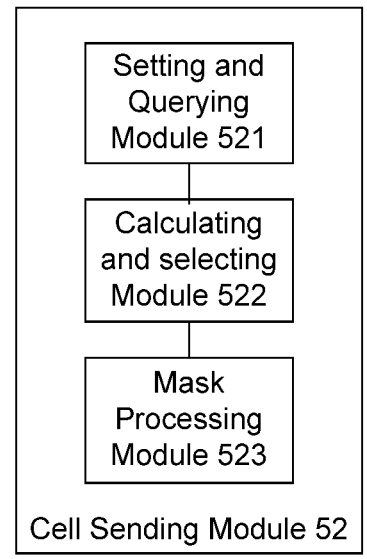
FIG. 6 is a structural diagram of a cell sending module in a load balancing apparatus according to an embodiment of the disclosure.

The cell sending module 52 includes a setting and querying module 521, a calculating and selecting module 522 and a mask processing module 523, as shown in FIG. 6, wherein the setting and querying module 521 is arranged to set, for the exchange apparatus at each stage, a corresponding load balancing mask table, and query the load balancing mask table while or after the unicast forwarding table is queried;

the calculating and selecting module 522 is arranged to perform an AND operation on query results about the unicast forwarding table and the load balancing mask table, and select a link having a smaller link number from an AND result via which the cell is sent; and the mask processing module 523 is arranged to set a mask corresponding to the selected link in the load balancing mask table as 0, with masks corresponding to the remaining unselected links unchanged, and write the modified mask back to the load balancing mask table.

During practical application, the setting and querying module 521, the calculating and selecting module 522 and the mask processing module 523 may be implemented by a CPU, a DSP or an FPGA in the cell sending module 52.

In an embodiment of the disclosure, the load balancing mask table records the link selected for sending the cell and the unselected links. For example, the selected link corresponding to an ID number of a destination access apparatus and the unselected links may be correspondingly recorded in each row of the load balancing mask table. After all links corresponding to an ID number of a certain destination access apparatus are selected, table entries in this row are re-modified as all links accessible to the access apparatus.

In an embodiment of the disclosure, the mask processing module 523 is further arranged to set initial values of table entries of the load balancing mask table corresponding to each destination access apparatus as 0, and write, after the unicast forwarding table is read and when no link is selected, all the read links into the load balancing mask table.

In an embodiment of the disclosure, the mask processing module 523 is further arranged to: record, before all the links are selected, the selected link for sending the cell and the unselected links in the load balancing mask table; and re-modify, after all the links are selected, the table entries in the load balancing mask table as all links accessible to the access apparatus.

In the embodiments of the disclosure, cells arriving to each destination access apparatus may be allocated to an accessible link in a balanced manner at an exchange apparatus at each stage by distinguishing the destination access apparatuses to which the cells arrive, so it may be ensured that the cells arriving to the destination access apparatus allocates data streams on all links in a balanced manner, thereby improving the utilization ratio of bandwidths and improving the exchange capability.

Those skilled in the art shall understand that the embodiments of the disclosure may be provided as a method, a system or a computer program product. Thus, forms of hardware embodiments, software embodiments or embodiments integrating software and hardware may be adopted in the disclosure. Moreover, a form of the computer program product implemented on one or more computer available storage media (including, but are not limited to, a disk memory, an optical memory and the like) containing computer available program codes may be adopted in the disclosure.

The disclosure is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may also be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may also be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

The above description is only the preferred embodiments of the disclosure and does not intended to limit the protection scope of the disclosure.

What is claimed is:

1. A load balancing method comprising:

querying, for an exchange apparatus at each stage, a unicast forwarding table according to an identification (ID) number of a destination access apparatus before each cell is sent, so as to obtain all links arriving to the destination access apparatus; and sending, in all the links, the cell arriving to the corresponding destination access apparatus in a polling way;

wherein sending, in all the links, the cell arriving to the corresponding destination access apparatus in a polling way comprises:

setting, for the exchange apparatus at each stage, a corresponding load balancing mask table, and querying the load balancing mask table while or after the unicast forwarding table is queried;

performing an AND operation on query results about the unicast forwarding table and the load balancing mask table, and selecting a link having a smaller link number from a result of the AND operation via which the cell is sent out; and setting a mask corresponding to the selected link in the load balancing mask table as 0, with masks corresponding to remaining unselected links unchanged, and writing the modified mask back to the load balancing mask table;

wherein the method further comprises: setting initial values of table entries of the load balancing mask table corresponding to each destination access apparatus as 0, and writing, after the unicast forwarding table is read and when no link is selected, all the read links into the load balancing mask table.

2. The method according to claim 1, wherein the load balancing mask table records the selected link for sending the cell and the unselected links, and after all links corresponding to an ID number of a destination access apparatus are selected, table entries in this row are all links accessible to the access apparatus.

3. The method according to claim 1, further comprising:

recording, before all the links are selected, the selected link for sending the cell and the unselected links in the load balancing mask table; and re-modifying, after all the links are selected, the table entries in the load balancing mask table as all links accessible to the access apparatus.

4. A load balancing apparatus placed in an exchange apparatus at each stage, the load balancing apparatus comprising a processor and a memory for storing instructions executable by the processor, wherein the processor is arranged to:

query a unicast forwarding table according to an identification (ID) number of a destination access apparatus before each cell is sent, so as to obtain all links arriving to the destination access apparatus; and send, in all the links, the cell arriving to the corresponding destination access apparatus in a polling way;

wherein the processor is arranged to:

set, for the exchange apparatus at each stage, a corresponding load balancing mask table, and query the load balancing mask table while or after the unicast forwarding table is queried;

perform an AND operation on query results about the unicast forwarding table and the load balancing mask table, and select a link having a smaller link number from a result of the AND operation via which the cell is sent out; and set a mask corresponding to the selected link in the load balancing mask table as 0, with masks corresponding to remaining unselected links unchanged, and write the modified mask back to the load balancing mask table;

wherein the processor is further arranged to set initial values of table entries of the load balancing mask table corresponding to each destination access apparatus as 0, and write, after the unicast forwarding table is read and when no link is selected, all the read links into the load balancing mask table.

5. The apparatus according to claim 4, wherein the load balancing mask table records the selected link for sending the cell and the unselected links, and after all links corresponding to an ID number of a destination access apparatus are selected, table entries in this row are all links accessible to the access apparatus.

6. The apparatus according to claim 4, wherein the processor is further arranged to: record, before all the links are selected, the selected link for sending the cell and the unselected links in the load balancing mask table; and re-modify, after all the links are selected, the table entries in the load balancing mask table as all links accessible to the access apparatus.

7. A non-transitory computer storage medium comprising a set of instructions, when executed, causing at least one processor to:

query, for an exchange apparatus at each stage, a unicast forwarding table according to an identification (ID) number of a destination access apparatus before each cell is sent, so as to obtain all links arriving to the destination access apparatus; and send, in all the links, the cell arriving to the corresponding destination access apparatus in a polling way;

wherein the instructions causing the at least one processor to send, in all the links, the cell arriving to the corresponding destination access apparatus in a polling way comprises instructions causing the at least one processor to:

set, for the exchange apparatus at each stage, a corresponding load balancing mask table, and query the load balancing mask table while or after the unicast forwarding table is queried;

perform an AND operation on query results about the unicast forwarding table and the load balancing mask table, and select a link having a smaller link number from a result of the AND operation via which the cell is sent out; and set a mask corresponding to the selected link in the load balancing mask table as 0, with masks corresponding to remaining unselected links unchanged, and write the modified mask back to the load balancing mask table;

wherein the non-transitory computer storage medium further comprises instructions, when executed, causing the at least one processor to: set initial values of table entries of the load balancing mask table corresponding to each destination access apparatus as 0, and write, after the unicast forwarding table is read and when no link is selected, all the read links into the load balancing mask table.

8. The non-transitory computer storage medium to claim 7, wherein the load balancing mask table records the selected link for sending the cell and the unselected links, and after all links corresponding to an ID number of a destination access apparatus are selected, table entries in this row are all links accessible to the access apparatus.

9. The non-transitory computer storage medium according to claim 7, further comprising instructions, when executed, causing the at least one processor to:
  record, before all the links are selected, the selected link for sending the cell and the unselected links in the load balancing mask table; and
  re-modify, after all the links are selected, the table entries in the load balancing mask table as all links accessible to the access apparatus.

* * * * *